United States Patent [19]

Edwards

[11] Patent Number: 4,773,042

[45] Date of Patent: Sep. 20, 1988

[54] RESIDENTIAL COMPUTER-BASED POSTAL MANAGER

[76] Inventor: Willie Edwards, 312 Kingston Dr., King, N.C. 27021

[21] Appl. No.: 898,910

[22] Filed: Aug. 21, 1986

[51] Int. Cl.⁴ .............................................. G06F 15/20

[52] U.S. Cl. ...................................... 364/900; 364/478

[58] Field of Search ............... 364/900, 200, 464, 466, 364/478; 235/379

[56] References Cited

U.S. PATENT DOCUMENTS 4,535,418 8/1985 Stockburger et al. .......... 235/379 X 4,584,648 4/1986 Dlugos ............................ 364/900 X

*Primary Examiner*—Raulfe B. Zache

[57] ABSTRACT

A community-based centralized postal delivery system which operates under the control of a slaved micro-computer. The slaved micro-computer itself being controlled by a master-computer located at the main post office. The micro-computer also being accessible and partially programmable by the postal delivery agent assigned to the postal zone. Typically, the end postal distribution point is an automated storage vault located in mid-block in a residential area. When universally addressed postage is magazine loaded into the vault by the postal delivery agent and the postal patron's mail compartment is occupied, the patron may interrogate an electronic module situated within his home to see if he has mail or facsimile material. Verification of such material is confirmed by the computerized vault returning a unique code with which the patron may access his mail porthole.

8 Claims, 3 Drawing Sheets

RESIDENTIAL COMPUTER-BASED POSTAL MANAGER

BACKGROUND

Most of us are familiar with the rapid rate of postal increases over the past years. The post office has made attempts to stem the financial increases of postal deliveries by mechanizing and automating some of its functions.

However, in the area of one of the greatest financial outlays—the salary of the postal delivery agent or letter-carrier—comparatively little has been done to increase his field efficiency.

Doubtless, the implementation of management information systems within the postal complexes themselves have kept the cost of postal deliveries from increasing even more than they already have. The basic fact is that if postal increases are to be checked to any substantial degree, then information management must be moved further—that is, brought out into the field where the delivery agent is operating.

Just as the door-to-door milkman has proven to be painfully inefficient, so then must be realized the inefficiency of delivering postage door-to-door, sometimes a single piece of mail at a time.

The residential centralization of postage under the control of a field-based computer would enable delivery agents to perform more efficiently. The ultimate result would be a much greater workload accomplishment per individual postal agent, necessitating fewer hours per agent in the field.

Speculation of late is made concerning the implementation of electronic-messaging. The reference is made even of a paperless society. As a communication tool, the telephone did not cause a decrease in the volume of mail. Neither has the computer replaced books as teaching tools. Furthermore, computers have certainly not eliminated school buildings and campuses. Rather, the computers complimented these functions. So, then, mail will be delivered. Especially when one considers that every private citizen is not likely to keep up an electronic messaging system or maintain properly—keep paper, chemicals, adjustments, etc in—a facsimile machine. The computer-based postal manager, however, is entirely postal-service maintained. With experience, therefore, as the judge, any transition to a system of the above mentioned will be partial and, that, greatly protracted. On the other hand, the residential computer-based postal manager is based upon principles and economic conditions which lend to its implementation now.

Not only is the system efficient for the residential and business community, but its efficiency can also be realized on military installations and college campuses for the routine distribution of mail and again on college campuses for the campus-wide distribution of facsimile. The bulk distribution by facsimile to the customers of public utilities can also be realized.

SUMMARY

From a hardware standpoint, the residential computer-based postal manager is architecturally simple.

The areas of composition are the numeric display module, the wiring and the storage vault.

The function of the display module, which is located in every home, is to verify to the postal patron that he or she has postage in the postal vault which is ready to be picked up. This same wall-mounted module is required in order to have generated a displayed number which is actually a coded combination or key permitting access to the storage vault.

The system wiring is constructed primarily of in-place utility wire. These are the same wires which deliver a.c. power to the residences. These wires ultimately connect to the aforementioned display module via a common in-home 110 v.a.c. receptacle. There is wiring of an additional nature connected to the storage vault, and this is a telephone cable.

The storage vault is located in its most liberal distribution in mid-block. Most of its storage area is below ground. Internally, it is compartmented, motor-driven and micro-processor controlled.

This postal vault is the drop-point for all the postage in the immediate area.

When a postal-patron has postage ready for him to pick up it is primarily this vault which makes it known to him via his wall-mounted display. This, then, is the residential system from a hardware standpoint and overview.

From the controlling standpoint, there are three computers. However, it is the central office computer which oversees the total operation of all the systems in all the zones, with two field computers performing the more immediate tasks associated with delivery. One of the two field computers is located in the home of the postal delivery agent and the other in his delivery vehicle.

DETAILED DESCRIPTION

The residential computer-based postal management system is comprised of three remote computers, a storage vault, system wiring and a home-based code module.

Figure 1:
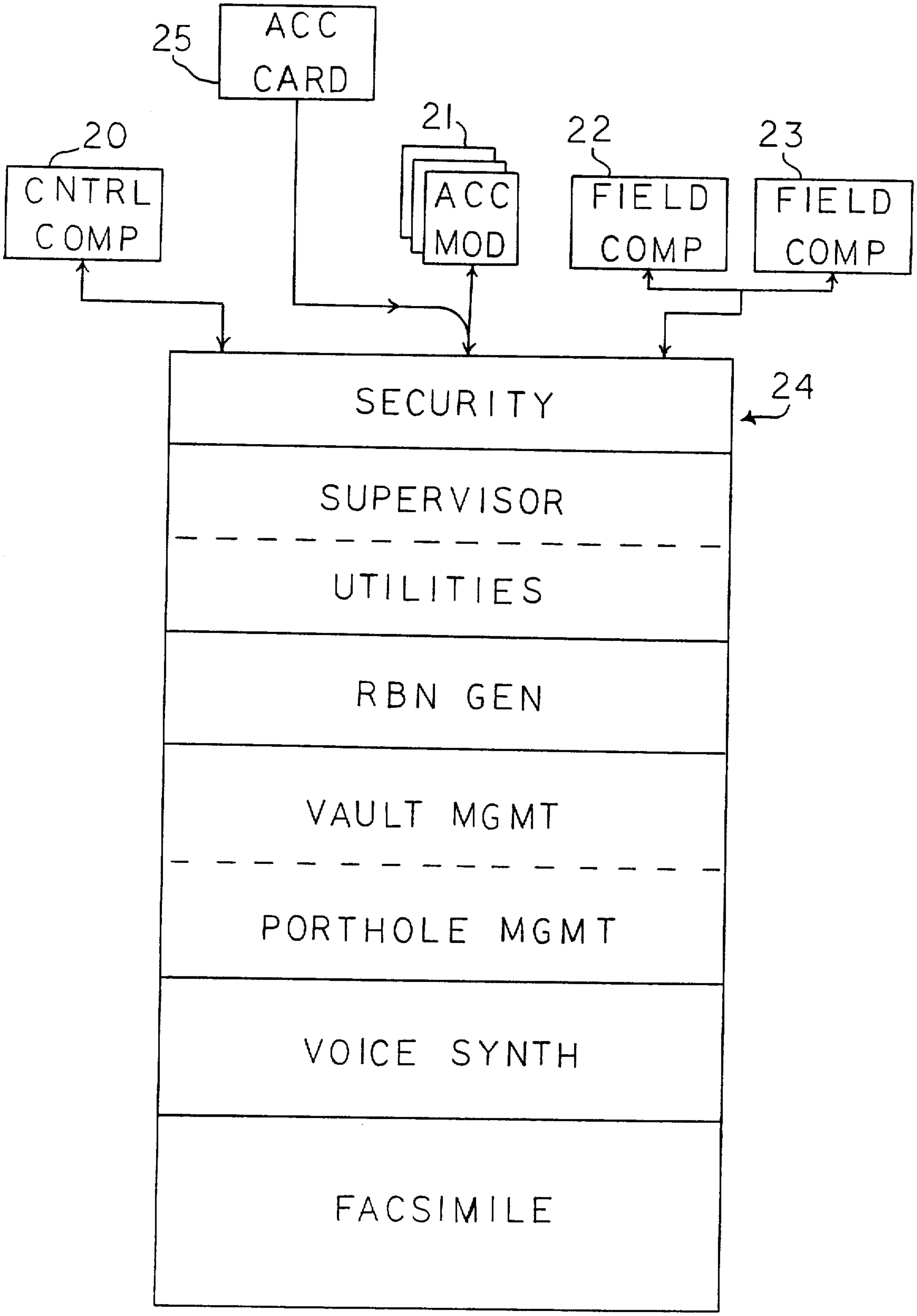
FIG. 1 is a software diagram showing the functions of the postal storage vault's microprocessor.

A description of the system operation can better be given by considering the system functions in the context of their areas of software allocation and application 24 as designated in FIG. 1.

CENTRAL COMPUTER

The central computer 20 (FIG. 1) is located at the regional post office. It has the task of overseeing all postal data operations in the assigned postal region. A region will have as few as 1 zone or as many zones as are municipally practical. All the vital data that are pertinent to the monitoring and controlling of the storage vaults 30 (FIG. 2) in all the zones are accessible to and by the central computer. When mail arrives at the regional post office it is gathered together according to its postal address. It is this computer which assigns each piece of mail its vault (postal) code. The separated batch of mail, which is going eventually into the same porthole of the same vault the following morning, is then bound in a heat shrinkable jacket and compressed to a tolerable degree. Data notation is made of the number of pieces destined for a particular vault and porthole. It is this same computer 20 which is able to monitor the current status of any given porthole. The central computer, by controlling a sorting system, channels each batch of mail into its proper rack or magazine. The central computer, which can provide the time of the last porthole vacancy, can also assign a vault access code and time of access in the event a patron has encountered problems which prevent him or her from obtaining an access code from their homebased access module. This is done by the postal authorities from the keyboard of the central computer after the party has visited the regional post office in person to justify such a procedure.

The central computer is also utilized in the transmission of facsimile.

ACCESS CARDS

This wallet-sized card 25 (selectively issued at the discretion of the postal authorities) saves the patron the trouble of having first to go home to interrogate her postal status. Still, it is good only at the patron's assigned vault. A typical application is for the elderly or an office secretary responsible for bulk mail situations for her employer.

ACCESS MODULES

Figure 3:
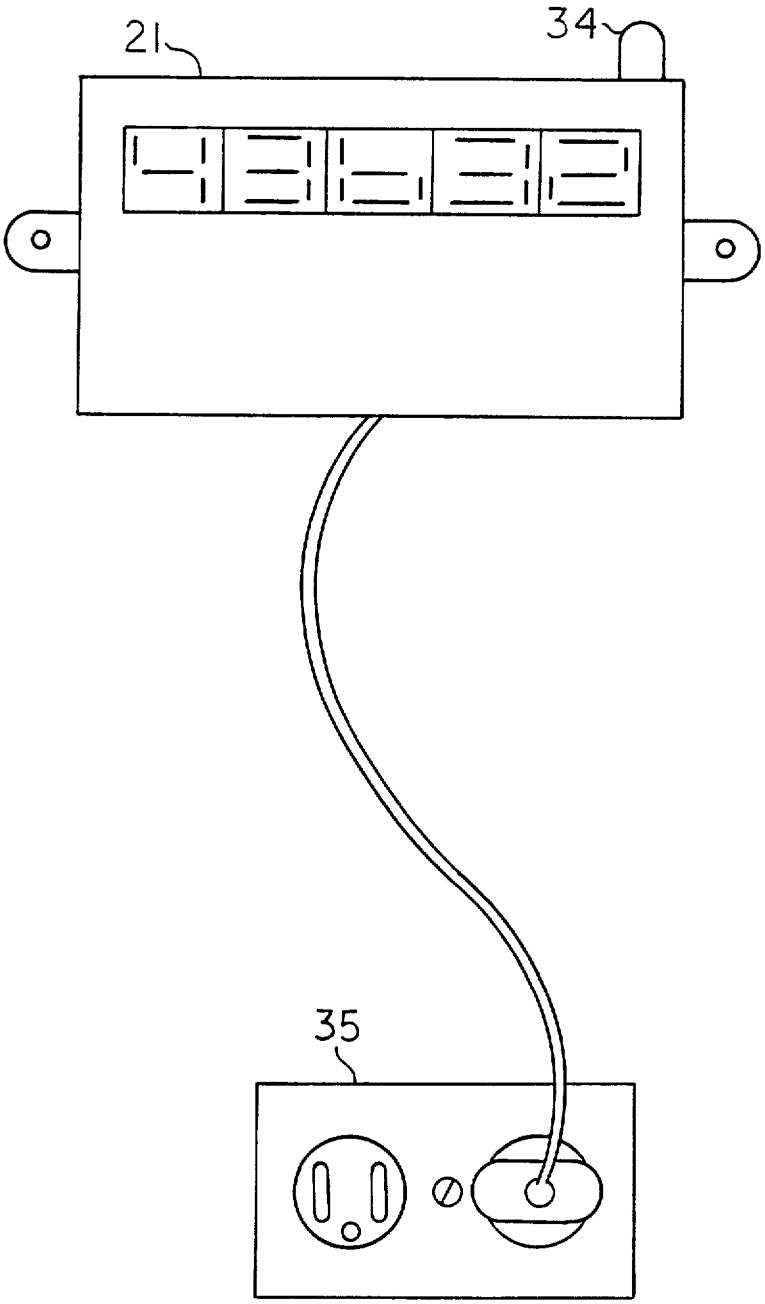
FIG. 3 is a picture of the access module used to communicate with the appropriate community storage vault.

The access modules 21 shown in FIG. 1 (again in FIG. 3) are the code keys to the postal storage vault. These modules which are wall-mounted (as shown in FIG. 3) are in every home or apartment which would normally have a mailbox. Although the mailboxes in the traditional setting would normally be situated outside of the dwelling areas, the access modules are mounted on the wall, preferrably just next to the back door for the sake of system uniformity. These modules are connected to the nearest 110 v. a. c. house line. Since they are the property of the postal service and, because of the name-vault code match-ups, are not interchangable on a house-to-house basis, they are normally connected to the 110 v.a.c. through the wall on a permanent installation basis although they can simply be plugged into an outlet 35 as is shown in FIG. 3. The modules are normally off, since they have automatic power-down circuitry. In the power-off state and an interrogation is desired, the patron depresses the pushbutton 34, turning on the unit and receiving an access code. Automatic power-down occurs after 3 minutes. Light emitting diodes or liquid crystal display provides a time dependant access code. That is, once the apartment occupant has depressed the interrogation button, he or she has 30 minutes within which to get to the postal vault to utilize that particular code. Subsequent interrogations, which are limited to 3 minutes minimum by internal circuitry, invalidate the previous acccess codes and the last code is valid for the 30 muinute time limit. Where neighborhood security dictates, once the pick-up is made, the remainder of the 30 minutes is no longer valid and if another access is desired, then a new code is required, otherwise as many entries into the vault as are desired may be made with the same given access code within the remaining 30 minutes. The option is programmable in the vault's microprocessor. Each module is digitally encoded as well as frequency tuned. The digital coder-decoder and the tuned circuit of the module are heavily encapsulated such that attempted entry destroys the internal circuitry. The coder section sends the postal patron's identity to the vault's microprocessor. In the event the debounced access module button is pushed to obtain an access code and the patron or occupant has no mail in the portholes which are assigned to him or her, the vault's microprocessor will return an EMPT or EMPTY message on the module's display, depending on the particular type of module. Immediately thereafter, though, an access number is still displayed momentarily. When a patron sees the EMPT or EMPTY display he or she knows that there is no mail and need not make an unnecessary trip to the mail vault. The generation of an access code for a no-mail situation, then, is to permit the patron access to the facsimile services of his particular vault should he desire such.

FIELD COMPUTERS

Figure 2:
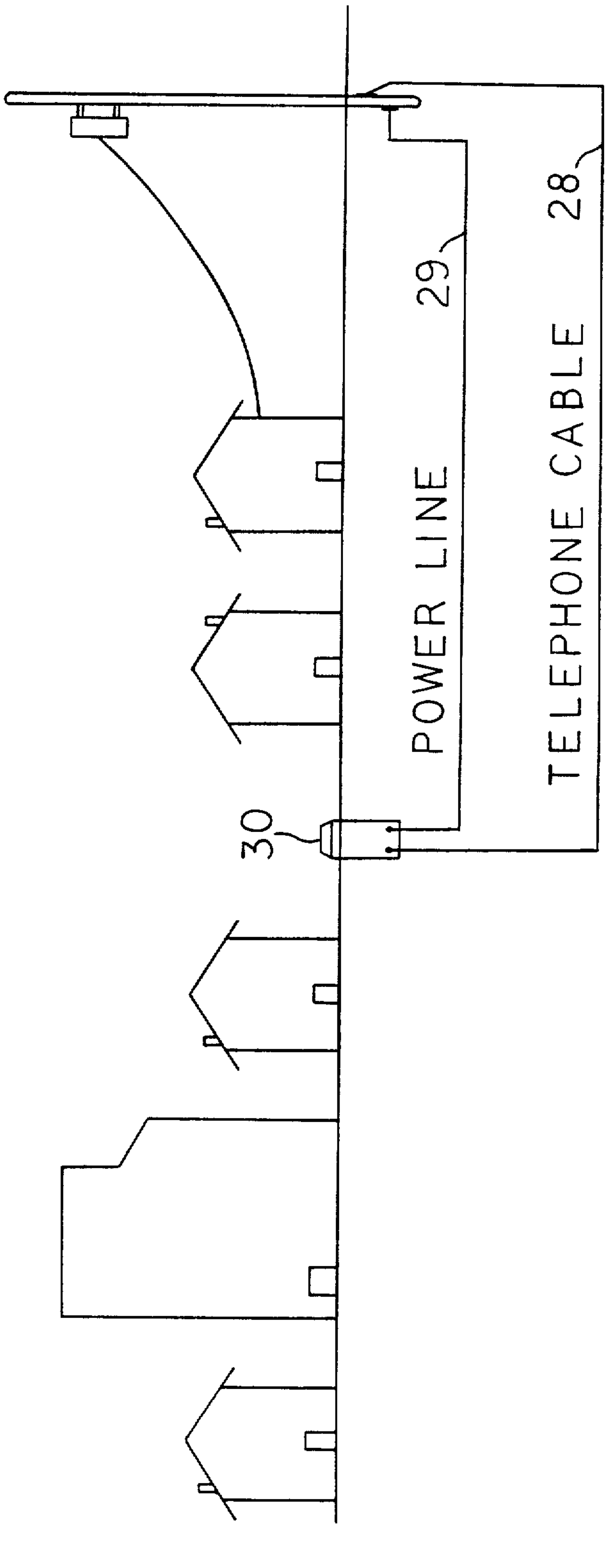
FIG. 2 is an implementative depiction of the mail storage vault in a typical setting.

There are normally two field computers. One computer 22 is located in the postal agent's home. The postal agent, by having the field computer in his home can interrogate the central computer at the regional post office and determine the status of his work load for the day. He can determine how much mail is to be delivered and to which vaults 30 (FIG. 2) in his zone. Also, he can access the vaults—in his assigned zone only—via telephone cable 28 (FIG. 2). If all the portholes are filled for a particular patron, the postal agent will known before starting his daily routine and if he, by accessing the central computer, sees that even more mail is due to be delivered to the already full portholes he can decide early on what remedial measures to take. He can determine how much paper is left in the vaults which have the facsimile machines. Field computer 23 performs basically the same functions as field computer 22 with the primary difference being that it (23) is mobile—stationed in the postal delivery vehicle—and therefore requires a radio link to the regional post office in order to access the postal vault.

SECURITY

Access to the postal vault's microprocessor is by any of five methods. Each method has its own password which is code generated. The five access modes—central computer, access card, access module, code-entry and field computers—all afford differing degrees of inter-action with the vault's microprocessor programs. Again, this is due to the level of security restrictions.

The central computer has the greater availability of the system including the ability to upload and download data as well as modify a portion of the microprocessor's memory.

Interaction with the vault's microprocessor is also possible by the use of a pesonalized patron access card which can be inserted into the vault's card slot. This card is recognized by the microprocessor of the patrons's community mail storage vault only. In the event the card is lost and it is feared that the security of the patron's postage is compromised, then, notification is given to the appropriate authorities and the card's fixed code (as opposed to the random code generated by the access module) is blocked via reprogramming through the central computer. A new card can then be issued.

The address or access modules also have a very limited degree of microprocessor interaction and when they are interrogated must send a module code which is headed by the vault's address and contains the unique unit code of the module itself. This code must conform to the format of the code listed within the vault's microprocessor. This method affords the system users more security than the preceding mode.

The security segment also works in conjunction with the random number generation segment of the software as well as the tuned transmission circuitry.

The code entry level is entered into when the patron has received his or her access code and is physically present at the hatch of the vault within the 30 minute time limitation. The patron then proceeds to depress the keys on the vault's keypad and having done so correctly can retrieve his mail from the compartmentalized plane (portholes) which has mechanically aligned itself with the previously locked hatch.

SUPERVISOR

The supervisor is stored in the vault's microprocessor memory. It is fundamentally the operating system in that it monitors all the activities associated with the operation of the vault. It is able to do this by interacting with and overseeing the orderly execution of the entire library of utility programs also stored within the vault's microprocessor's memory.

UTILITIES

The vault's utility programs operate under control of the supervisor. The several utilities in the postal vaults are the programs which permit real-time interaction with the central computer, access modules, field computers and every vault function which occurs. In interacting with the associated instructions, arguments and working memory addresses pertinent to the specific function, once the vault's magazine is loaded, the vault is capable of doing its job independent of further human intervention.

Although all the postal vaults have the same basic utilities, all of the vaults do not necessarily have the same number and special function utilities. For instance, some neighborhoods may not have the demand for facsimile production that other neighborhoods may have, hence, the utility to generate facsimile would be ommited for that particular vault.

RANDOM BINARY NUMBER (RBN) GENERATION

The generation of access codes is an all important and integral part of the vault system's software. Needless to say, the random binary number generator and pertinent hardware is also indispensable. Without the ability to provide the paying postal patrons with access to their mail the system is useless. Yet, access must be easy enough to provide comfort of use and still provide a sure measure of security.

Once the interrogate button on the residential access module is depressed and the conditions of security have been satisfied, a series of numbers is generated and put on the communication link. Each string or succeeding group of numbers is highly unlikely to match any other string or group. The only limitation on the group is its number of characters. Sufficient memory is allocated which will record the module number requesting an access code, record the access code generated in response to the interrogation and act independently of the access module to monitor the time factor involved. When the patron arrives at the postal vault to retrieve his or her mail it is this part of memory which must be satisfied—by keypad entries—before access can be gained to the vault.

Doubtless, the greater the patron density in a given area, the greater the requirement for memory allocation.

VAULT MANAGEMENT

The vault management aspect of memory acts in conjunction with and under control of the pertinent utility. All the general conditions which have to do with the operation of the vault are stored in the vault management section of memory. It is this part of memory that the central computer and the two field computers will access to determine the overall status of a particular postal vault.

The operation of the motorized porthole positioning system, the check of the condition of the voice systhesis system, facsimile access and paper level, etc. are some of the functions associated with vault management. System's verification is made known through its processes. Also, the larger part of the vault's microprocessor's temporary and scratchpad memory is found there. The selection of the access modules group frequencies is carried out by the vault management program.

PORTHOLE MANAGEMENT

The purpose of the porthole management capability is to control the offloading of the postal vault magazine, to notify the postal patron that he or she has postage available and to allow the postal delivery agent to check on the availability of new mail space. It can also be used to determine the last date of pick-up. The bulk of the portholes are always positioned below ground level inside the vault. The portholes—which are chain-driven recirculating compartments- are able to transmit their occupied or empty status by the use of photo-sensitive diodes situated within each individual compartment. Several compartments (portholes) are on a horizontal plane and each patron or residence served by an access module is assigned a plane and therefore a group of portholes. If a patron has notified the post office that he or she is to be on vacation (i.e. from March 10 thru March 20) then the central computer and the field computers will have this information available to them and the magazines will not be loaded with postage destined for his particular portholes. Thus, the portholes are not filled to excess.

When the fresh or current day's postal magazine is loaded, by mechanically unlocking the vault 30 (FIG. 2), removing the previous days magazine, and sliding the current magazine into place, the porthole monitoring program will offload the new magazine into the portholes. This offloading is dependent upon what the program sees in regard to the individual portholes.

The porthole monitoring and vault management work in close conjunction.

VOICE SYNTHESIS

One of the applications of speech synthesis is the giving of notification of a large package to be picked up at the post office. It is used to remind the postal delivery agent of a low paper condition in the facsimile system. In the case when the postal patron has been remiss in picking up his mail and the current magazine is still loaded with his most recent mail because his portholes were already full, the synthesized voice would give appropriate instructions. Such an instruction would tell the patron who has just gained access that "you have additional mail. After you close the door, enter hour number again."

FACSIMILE

The facsimile hardware and vault are a unitized structure. The facsimile portion is top-mounted on the smaller vaults and side or front-mounted on the larger vaults. The facsimile capability is linked to the system by telephone cable 28 (FIG. 2). When a facsimile page is generated it is folded over and through the facsimile and vault management utilities is delivered by the magazine to the specified porthole. This, then, necessitates the sender knowing the appropriate vault or postal code which is also needed and referred to in the operation of the central computer.

When a patron wishes to gain access to facsimile generation he may do so by routinely obtaining an access number from his residential access module. When the patron has reached the postal vault and entered the appropriate access digits in the vault's keypad he now only has to depress the FACS bar on the keypad to release the switch securing the weight-balanced self-locking machine lid. Again, the synthesized voice instructs those who are not familiar with the operations—which are standard and common to all the postal vaults with which they are equipped.

The facsimile accomdation is accounted for by the purchasing of facsimile units from the local post office, at which time the paying patron's module identification code is entered into the central computer along with the number of units purchased. A tally is automatically kept of the number of units used and how many remain. Longer distance transmissions consume more units.

MAIL VAULT

Referring to FIG. 2:

The community-based mail vault 30 is located in the position or area of greater accessability and convenience. As such, it is not unlike some situations which already prevail in many rural and semi-rural areas where several and sometimes dozens of mailboxes are grouped in a central location. Even in urban areas where there are large concentrations of dwelling units, this same concept of centralization is often seen in courtway buildings. Constructed in various sizes—depending on local loading factors—the vault which is almost always located outdoors—is sometimes installed inside the lobbies of large building complexes. Inside the lobbies, they are sometimes mounted flush in the walls, two or more side by side. Outside as well, they are capable of installation within the side of a building. The waterproof structure has its own wiring and independent metering provisions. On the power line 29 and associated access module links—which carry the amplfied signals small value coupling capacitors are installed. These capacitors are of a rating and quality such as not to compromise the integrity of the utility distribution groups connected to the transformers.

I claim:

1. A field-based computerized system having a plurality of telephone links for providing postal patrons with postal-class material comprising:
   - central control means comprising a control computer having a plurality of telephone links, including links to a plurality of identical central control means and each said central control means being responsive to a unique set of codes;
   - operational storage means having a plurality of signal links, including link to said central control means, for storing said postal-class material in order that from said operational storage means said postal patrons may receive intended items;
   - microprocessor control means responsive to a plurality of input signals and said unique set of codes, located within said operational storage means for managing and monitoring mechanical and electronic operational functions within said operational storage means;
   - first communication means for interaction with said computerized system comprising a plurality of remote electronic modules located within homes of said postal patrons and providing two-way communication signaling between said postal patrons and the microprocessor residing within said operational storage means in order to provide to said postal patrons an access code based upon monitoring results of said operational storage means;
   - first transmission means comprising household utility power lines connected between said remote electronic modules located within said homes of said postal patrons and said microprocessor residing within said operational storage means for providing transmission medium for said two-way communication signaling between said postal patrons and said operational storage means;
   - second communication means comprising a plurality of remote computers for giving a communicator means of access to and determining monitored status of said operational storage means;
   - second transmission means comprising a telephone line connection to said operational storage means for providing signal transmission link between said remote computers and said operational storage means.

2. A system according to claim 1 wherein said operational storage means is comprised of hardware means mechanically and programmatically integrated into said operational storage means for generating a portion of said postal-class material in form of facsimile and further comprising hardware and program means for making available to postal patrons said facsimile material and all stored postal material.

3. A system according to claim 1 wherein said operational storage means having a plurality of signal links, including said link to said central control means for storing said postal-class material comprises means for such storage by processing a unique computerized system-wide numeric address code residing within said field-based computerized system and assigned to said postal-class material.

4. A system according to claim 1 comprising a conservation means wherein said remote electronic modules are connected to said household utility power lines and remain in an off state until interrogated by said postal patrons.

5. A system according to claim 1 comprising a keypad entry means affixed to said operational storage means whereby said postal patrons may gain access to said operational storage means by entering a code.

6. A system according to claim 1 wherein said microprocessor provides means for synthesized speech to facilitate interaction by said postal patrons.

7. A centrally established computer-based postal material distribution system comprising:
   - a nation-wide network of telephone-interconnected central control computers established in geographical regional formats and being responsive to numeric codes;

a numeric-based postal distribution means for processing and making available to a postal patron mailable items by assigning said items a code representative of a postal patron's name and mailing address and said code residing within said nation-wide network and designating a pre-assigned physical location within the geographical region in which said postal patron resides;

operational storage means having a plurality of electrical links and residing within said geographical region and containing said preassigned physical location wherein said mailable items are stored;

microprocessor control means residing within said operational storage means responsive to a plurality of input data signals for controlling and recording status of a plurality of operational functions of said operational storage means in order to make available said mailable items, including generation of access signals used to control access to said operational storage means;

facsimile generation means mechanically and electrically incorporated into said operational storage means for generating facsimile material to make available to said postal patron;

telephone cable connection means comprising one of said electrical links to said operational storage means for providing medium for data signal transmission between said operational storage means and said nation-wide network of telephone-interconnected central control computers;

household utility power line connection means comprising one of said electrical links to said operational storage means for providing a medium for data signal transmission between said microprocessor control means residing within said operational storage means and residence of said postal patron;

communication means comprising an electronic two-way interrogation-and-response communication module residing within said residence of said postal patron and connected to said household utility power line for providing said postal patron with functional status of said operational storage means, including acquisition of said access signals used to control access to said operational storage means;

access means comprising keypad entry means affixed to said operational storage means whereby said postal patron may gain access to said operational storage means by entering a code in form of said access signals.

8. A postal system for secure distribution of mailable materials comprising:

central control means whereby a select master computer being part of a telephone-connected nation-wide network of said master computers is located within a regional postal office facility and is able to download program functions via telephone to a programmable microprocessor controller located within a centralized operational storage means;

centralized operational storage means containing said programmable controller, comprising a vault structure wherein said mailable materials are loaded for distribution and said centralized operational storage means residing within a postal patron's residential area;

first connection means comprising a telephone link for enabling a plurality of local computers including said select master computer to communicate with said programmable microprocessor controller, said programmable microprocessor controller being located within said centralized operational storage means;

programmable microprocessor control means incorporated within said centralized operational storage means for conducting operational functions and monitoring operational status of said centralized operational storage means;

monitoring means whereby select said local computers are able via said first connection means to ascertain said operational status of said centralized operational storage means;

communication means comprising a plurality of electronic two-way communication modules located within the postal patrons' residences for enabling said postal patrons to interrogate status of and request and receive an access code to said centralized operational storage means;

second connection means comprising household utility power line wiring connected between said centralized operational storage means and said electronic two-way communication modules located within said postal patrons' residences for enabling said electronic two-way communication modules to communicate with said centralized operational storage means;

access means comprising a plurality of personalized postal patron coded passcards for gaining access to said centralized operational storage means.

* * * * *